Dec. 29, 1959 J. W. JACOBS 2,919,340
DOMESTIC APPLIANCE
Filed Dec. 5, 1956 4 Sheets-Sheet 1

INVENTOR.
James W. Jacobs
BY
His Attorney

Dec. 29, 1959

J. W. JACOBS 2,919,340

DOMESTIC APPLIANCE

Filed Dec. 5, 1956

INVENTOR.
James W. Jacobs
BY *Edwin L. Dybvig*
His Attorney

United States Patent Office 2,919,340
Patented Dec. 29, 1959

2,919,340

DOMESTIC APPLIANCE

James W. Jacobs, Dayton, Ohio, assignor to General Motors Corporation, Detroit, Mich., a corporation of Delaware Application December 5, 1956, Serial No. 626,419

2 Claims. (Cl. 219—37)

This invention relates to a domestic appliance and more particularly to a pre-wired kitchen assembly.

An object of the invention is to provide a pre-wired kitchen assembly wherein the kitchen assembly is wired in the field by simply connecting the circuit breakers contained within a circuit breaker box with a three-wire distribution system, and by connecting the output leads from the circuit breaker box with the various electrically operated appliances included in the kitchen assembly. The circuit breaker box contains a plurality of push-button type circuit breakers connected with the electrically operated appliances in order that the circuit breakers may be re-set when they are opened due to an overload at one of the electrically operated appliances. The circuit breaker box is located in a convenient position in the kitchen assembly within easy reach of a user. The kitchen assembly also includes a control panel located in a readily accessible position, the control panel having controls connected with a plurality of top surface heating units and connected with an electrically heated oven. With the arrangement just described the circuits to the various electrical appliances may be re-set when an overload occurs without replacing fuses in a circuit breaker box that may be located at some distance from the kitchen assembly.

Another object of this invention is to provide a control circuit for an electric motor driven exhaust fan that is associated with the kitchen assembly, the fan being automatically set into operation whenever a major heat generating appliance is energized for use.

Further objects and advantages of the present invention will be apparent from the following description, reference being had to the accompanying drawings, wherein a preferred form of the present invention is clearly shown.

Figure 1:
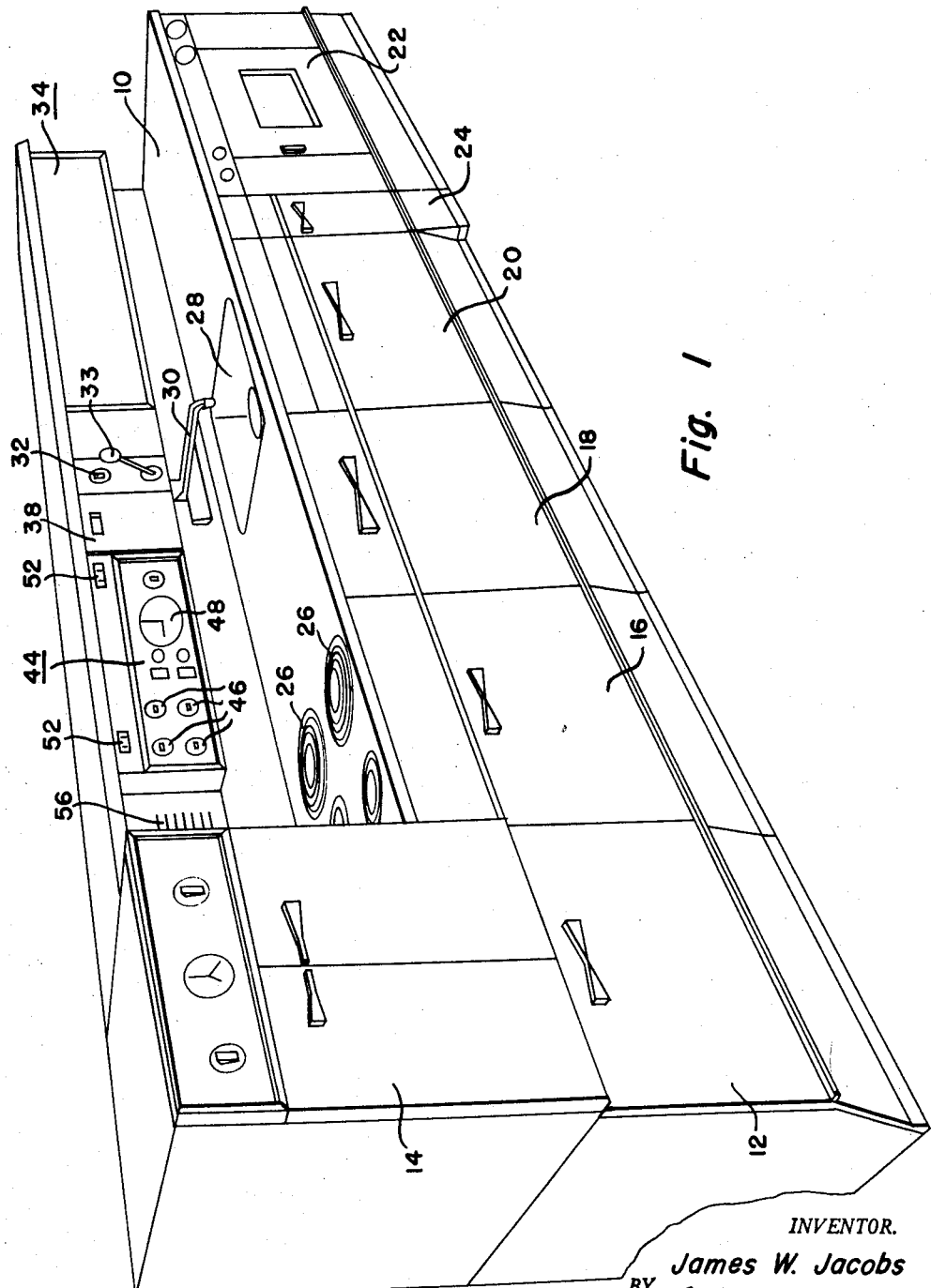
Figure 1 is a perspective view of a kitchen assembly made in accordance with this invention.

Referring now to Fig. 1, the kitchen assembly of this invention comprises a plurality of kitchen cabinets and electrically operated appliances located in side-by-side relationship. The appliances and cabinets may be fitted within a metal framework (not shown) that supports a unitary counter-top 10. The assembly preferably comprises a lower cabinet 12 that supports an electrically heated wall oven 14. A second electrically heated oven 16 is disposed adjacent the cabinet 12. The oven 16 may be replaced with a kitchen cabinet, if desired, in installations where only the wall oven 14 is needed. The assembly further includes a dishwasher 18, a storage cabinet 20, a combination washer and dryer 22, and another storage cabinet 24 interposed between the cabinet 20 and the combination washer and dryer 22. The counter-top 10 supports a plurality of electrically heated surface units 26 that are built into the counter-top. A sink 28 is also built into the counter-top 10 and is disposed above the cabinet 20 and below a spout 30. A waste disposal unit 31, shown in Fig. 2, may be connected with the drain aperture of the sink 28 and is preferably controlled by a switch actuating knob 32. The water supply to the pipe 30 is controlled by a control handle 33 located immediately below the control knob 32.

Figure 4:
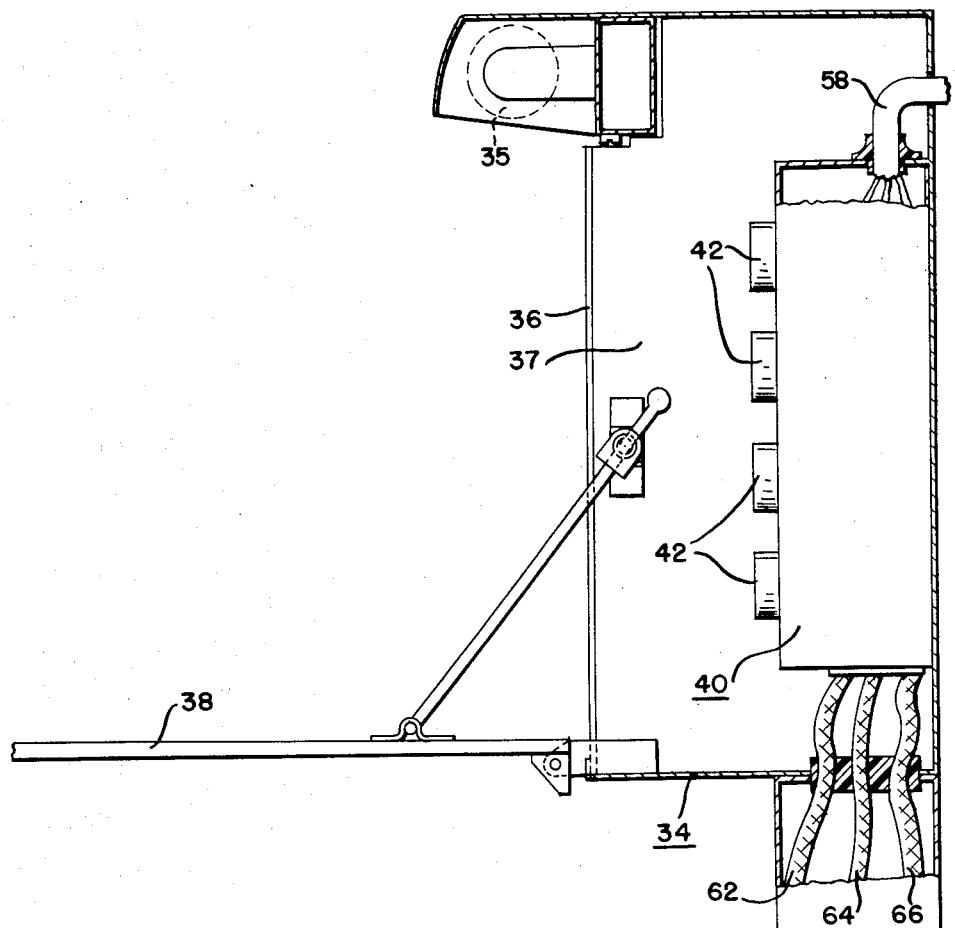
Figure 4 is a vertical sectional view of a circuit breaker box located in an upper overhanging portion of the kitchen assembly.

The kitchen assembly is provided with an upper overhanging cabinet portion generally denoted by reference numeral 34 and better shown in Fig. 4 of the drawings. The upper overhanging portion as shown in Fig. 4 may be provided with fluorescent lamps 35 located along the length of the upper overhanging portion. The upper cabinet 34 is provided with a circuit breaker box 36 that has a front access opening closable by a door 38. The door 38 is pivoted at its lower end to the circuit breaker box 36 and when in an open position provides access to the interior of the circuit breaker box. The circuit breaker box 36 encloses a plurality of circuit breakers, generally denoted by reference numeral 40, that are re-set after an overload occurs by manual actuation of push-buttons 42. The circuit breakers which are re-set by push-buttons 42 are of the conventional push-button type well known to those skilled in the art. The electrical connections between the circuit breakers 40 and the various electrically operated appliances of the kitchen assembly are more fully described hereinafter.

The upper cabinet 34 is provided with a control panel, generally denoted by reference numeral 44, and located immediately adjacent the circuit breaker box 36. The control panel supports control knobs 46 that control the supply of current to top surface units 26. The control panel is further provided with a clock or timer 48 which controls the supply of current to the electrically heated oven 16 in a manner to be more fully described hereinafter. The upper cabinet 34 may be also provided with conventional electrical outlet plugs 52 disposed immediately above the control panel 44. An exhaust fan 54 driven by an electric motor 53 is supported in the upper cabinet 34 immediately behind louvers 56. The exhaust end of the blower is connected by suitable piping (not shown) to the atmosphere.

Figure 2:
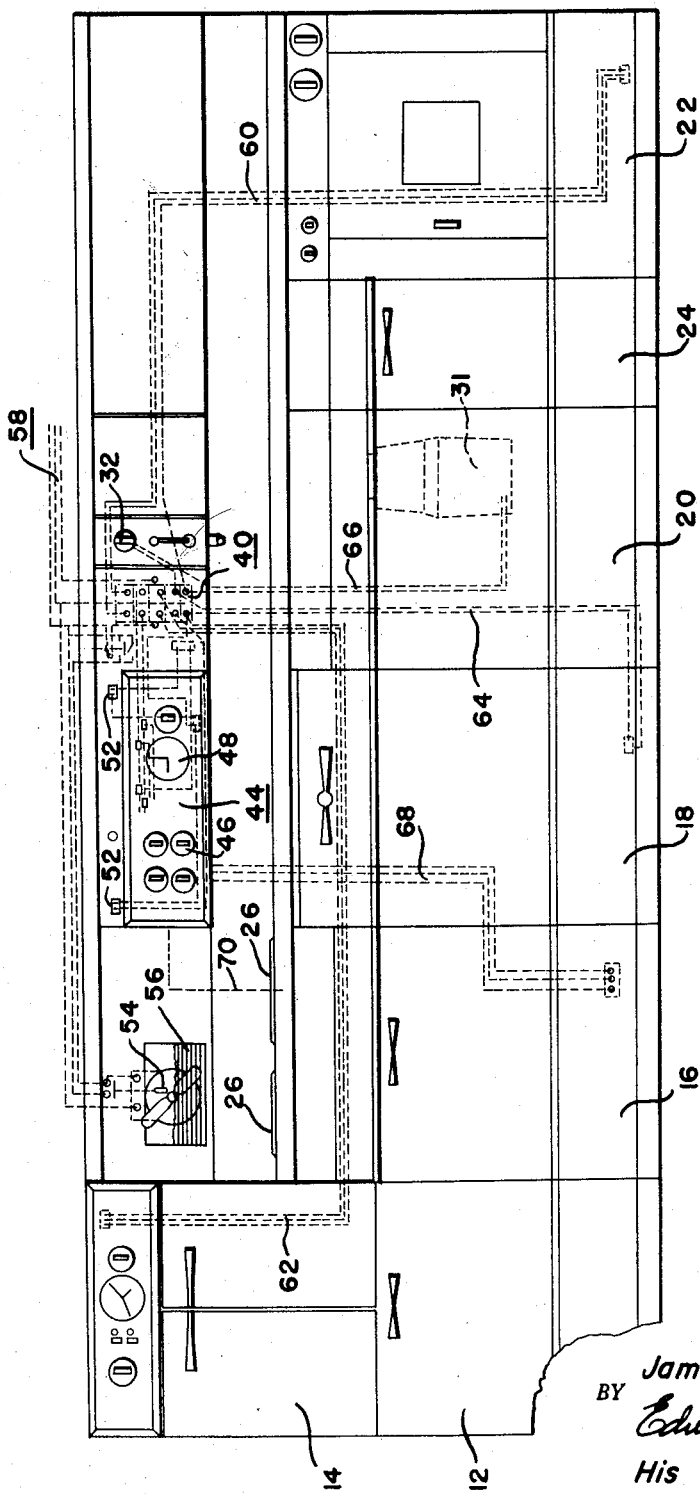
Figure 2 is a front view of the kitchen assembly shown in Fig. 1 and showing the positions of the electrical leads connecting the circuit breaker box and electrically operated appliances that are included in the kitchen assembly.

The locations of the electrical wires connecting the circuit breaker box 36 and the various electrical appliances are shown in Figs. 2 and 4. The circuit breakers 40 are connected with an input three-wire line, generally denoted by reference numeral 58, the three-wire line passing through the rear wall of circuit breaker box 36, as shown in Fig. 4. The circuit breakers 40 are connected with the combination washer and dryer by electrical leads, generally denoted by reference numeral 60, with the wall oven 14 by leads denoted by reference numeral 62, with the dishwasher 18 by leads designated by reference numeral 64, and to the waste disposal unit 30 by leads denoted by reference numeral 66. The oven 16 is connected with the controls on control panel 44 by means of leads generally denoted by reference numeral 68, while the top surface units 26 are connected with switches actuated by control knobs 46 through leads denoted by reference numeral 70. The leads 62, 64 and 66 pass downwardly through the lower wall of circuit breaker box 36 and branch out to the various appliances as shown in Fig. 2. It will thus be apparent that the kitchen assembly is pre-wired, and that all that is necessary for a complete wiring of the assembly is the connection of the circuit breakers 40 with the three-wire line 58 and connection of the leads 60, 62, 64, 68 and 70 with the appliances, as shown in Fig. 2.

Figure 3:
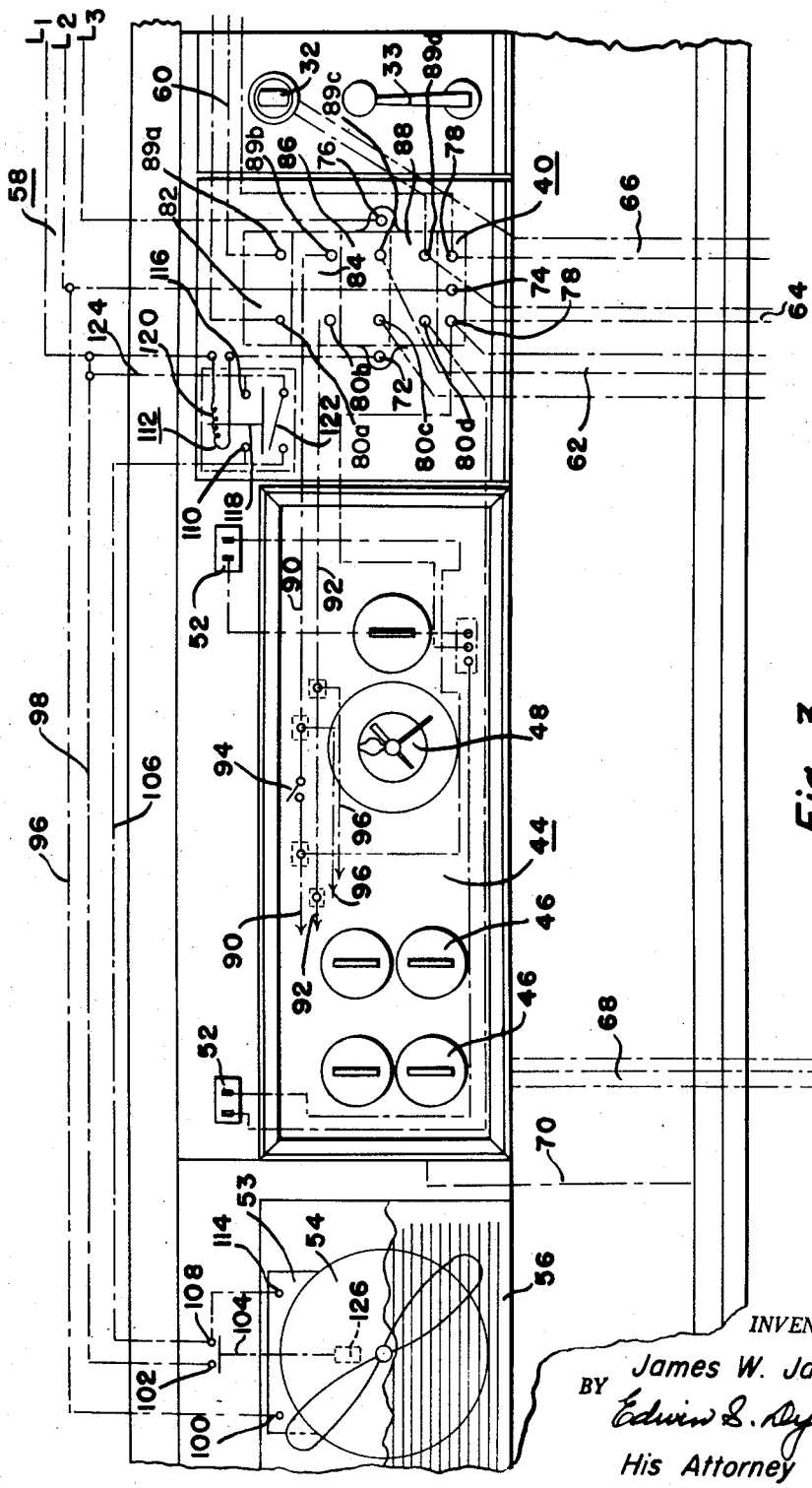
Figure 3 is an enlarged fragmentary front view of a portion of the kitchen assembly shown in Fig. 2.

The particular wiring connections for the circuit breakers 40 and for the control panel 44 will now be described with particular reference to Fig. 3. The three-wire input leads $L_1$, $L_2$ and $L_3$, generally denoted by reference numeral 58, are connected, respectively, with terminals 72, 74 and 76 of the circuit breakers 40. The line $L_2$ is the neutral line of the three-wire system and is connected with neutral terminals 78. The terminal 72 is connected with input terminals 80a, 80b, 80c and 80d of circuit breakers 82, 84, 86 and 88, while the terminal 76 is connected with input terminals 89a, 89b, 89c and 89d of the same circuit breakers when the circuit breakers are in a closed position. The circuit breakers 82, 84, 86 and 88, as noted hereinbefore, are of the well known conventional push-button type which may be re-set by manual actuation of push-buttons 42, as shown in Fig. 4. The individual circuit breakers are so constructed as to normally maintain a closed connection between terminal 72 and terminals 80a, 80b, 80c and 80d and between terminal 76 and terminals 89a, 89b, 89c and 89d. When an individual circuit breaker moves to an open position due to an overload at an appliance connected with the circuit breaker, the connection between the terminal 72 and one of the individual terminals 80a, 80b, 80c or 80d is opened, as is the connection between terminal 76 and an individual terterminal 89a, 89b, 89c or 89d. Thus, when circuit breaker 82 is in an open position, the connection between terminal 72 and terminal 80a is broken, as is the connection between terminal 76 and terminal 89a. The circuit breakers 82, 84, 86 and 88 have different amperage capacities, the circuit breaker 82 having a 30 amp. capacity, the circuit breaker 84 having a 50 amp. capacity, the circuit breaker 86 having a 30 amp. capacity, and the circuit breaker 88 having a 20 amp. capacity. The various terminals associated with circuit breakers 40 are connected with leads 62, 64 and 66, as shown in Figs. 2 and 3.

The terminals 80b and 89b of circuit breaker 84 are connected to leads 90 and 92, the lead 90 including a clock operated switch operated by clock 48. In practice, the leads 90 and 92 pass through the wall 37 of circuit breaker box 36, the wall separating the circuit breaker box from the area behind control panel 44. The leads 90 and 92 leading from the clock operated switch 94 are designated by reference numeral 68, and it will thus be apparent that the energization of oven 16 is under the control of the clock operated switch 94 located on the control panel 44. The wall oven 14 might also be controlled from the clock operated switch 94 in installations where a lower oven 16 is not used and where the oven 16 is replaced by a kitchen cabinet. If the wall oven 14 is controlled from control panel 44, the clock operated controls mounted on the wall oven would not be used. A pair of leads 96 branch off from leads 90 and 92 and are connected through conventional switch means with the top surface units 26 by leads designated by reference numeral 70. The switch means is controlled by control knobs 46 supported on the control panel 44. The circuit connections between the leads 96 and the switch means are not shown, but may be of any well-known type.

The control circuit for the exhaust fan 54 includes leads 96 and 98 connected, respectively, with lines $L_2$ and $L_1$. The lead 96 is connected with a terminal 100 of the electric motor 53. The lead 98 is connected with a contact 102 which forms part of a switch that is adapted to be closed by contactor 104. A lead 106 is connected between a terminal 108 and a terminal 110 of a current relay generally denoted by reference numeral 112. The terminal 108 is connected with a second input terminal 114 of motor 53. The current relay 112 includes terminals 110 and 116 that are short circuited at times by a contactor 118. The contactor 118 is pulled up to a closed position by the coil 120 of the current relay. A manually operable switch 122 is connected across lines 106 and 124 in parallel with contacts 110 and 116. The current relay coil 120 is connected in series with line $L_1$ that leads to the terminals 72 of circuit breaker 40. The contactor 104 is moved to a closed position by a thermostat 126 located at the exhaust of blower 54. The contactor 104 moves to a closed position whenever the temperature at the exhaust of blower 54 reaches some predetermined value.

With the above-described control circuit, the electric motor driven blower 54 is set into operation whenever current is flowing through line $L_1$ and relay coil 120. The circuit connections, as will be seen from an inspection of Fig. 3, are such that whenever the wall oven 14, the lower oven 16, the dishwasher 18, the top surface units 26, and the washer and dryer 22 are operated, current necessarily flows through line $L_1$. The current flowing in line $L_1$ energizes the coil 120 to pull up contactor 118 and thus completes a circuit to electric motor 53 that drives the blower 54. The energization of the waste disposal unit of the fluorescent lights will not energize the relay coil 120 as the waste disposal unit and lighting circuits are fed from line $L_3$ rather than line $L_1$ and no current flows in line $L_1$ when the disposal or lights are energized. Thus, it is apparent that the relay coil 120 is only energized when major heat generating appliances are energized and that the connections from the circuit breaker to the appliances and the connection of the relay 120 and line $L_1$ is designed to effectuate this purpose.

The electric motor 53 may also be actuated by a manual closure of switch 122 and by a short-circuiting of contacts 102 and 108. Thus, the electric motor 53 will be energized when the temperature at the exhaust of the blower 54 reaches some predetermined value. The blower motor 53 and blower 54 will continue to operate even after the relay coil 120 is deenergized until the exhaust temperature has been reduced to some predetermined value. If desired, the blower 54 might be connected in the wall of a kitchen rather than being connected in the kitchen assembly. With such a construction, no conduit means would be needed for connecting the exhaust of the blower with the atmosphere. It will also be apparent that the control circuit disclosed in Fig. 3 might be used where the blower 54 is wall-mounted rather than being mounted in the kitchen assembly.

While the form of embodiment of the invention as herein disclosed constitutes a preferred form, it is to be understood that other forms might be adopted, as may come within the scope of the claims which follow.

What is claimed is as follows:

1. In combination, a kitchen cabinet having a counter-top and including a part overhanging said counter-top within easy reach of a user of the cabinet, a plurality of electrically operated appliances associated with said cabinet, a circuit breaker box mounted in said overhanging portion having a front opening closable by a door, a plurality of push-button actuated circuit breakers located within said box with the faces of said push-buttons facing said access opening, input electric power leads connected to the input side of said circuit breakers, electrical leads leading from the output side of said circuit breakers to said appliances, an electric motor driven exhaust fan in said cabinet connected to the atmosphere, and means responsive to energization of certain of said appliances for energizing said exhaust fan.

2. An upper kitchen cabinet assembly adapted to be secured to a lower cabinet structure that houses a plurality of electrically operated appliances, a fan in one of said cabinets, a relay for said fan, one of said cabinets having a circuit breaker box and a control panel located in side-by-side relationship and separated by a common wall, a plurality of push-button actuated circuit breakers in said circuit breaker box, a main power line leading into said circuit breaker box through said relay and connected to one side of said circuit breakers, control means located on said control panel for controlling the current supply to certain of said appliances, electrical power leads connecting the opposite side of said circuit breakers and the input side of said control means and passing through said common wall, and power leads connected with the output side of said control means extending outwardly of said control panel and adapted to be connected to certain of said appliances, whereby said relay is energized simultaneously with said certain of said appliances to operate said fan.

References Cited in the file of this patent

UNITED STATES PATENTS

| | | |
|---|---|---|
| 1,288,507 | Carmean et al. | Dec. 24, 1918 |
| 1,726,830 | Hobson | Sept. 3, 1929 |
| 2,182,106 | Ames | Dec. 5, 1939 |
| 2,349,541 | Earle | May 23, 1944 |
| 2,491,420 | Scott | Dec. 13, 1949 |
| 2,539,613 | Earle | Jan. 30, 1951 |
| 2,641,679 | Brodbeck | June 9, 1953 |
| 2,703,837 | Crone | Mar. 8, 1955 |
| 2,810,057 | Nolan | Oct. 15, 1957 |

FOREIGN PATENTS

| | | |
|---|---|---|
| 503,135 | Great Britain | Mar. 31, 1939 |
| 665,220 | Great Britain | June 19, 1948 |